United States Patent [19]

Eino

[11] Patent Number: 4,687,608
[45] Date of Patent: Aug. 18, 1987

[54] COMPOSITE PERMANENT MAGNET FOR MAGNETIC EXCITATION AND METHOD OF PRODUCING THE SAME

[75] Inventor: Muneyoshi Eino, Kumagaya, Japan
[73] Assignee: Hitachi Metals, Ltd., Tokyo, Japan
[21] Appl. No.: 743,274
[22] PCT Filed: Jul. 14, 1982
[86] PCT No.: PCT/JP82/00265
§ 371 Date: Mar. 10, 1983
§ 102(e) Date: Mar. 10, 1983
[87] PCT Pub. No.: WO83/00264
PCT Pub. Date: Jan. 20, 1983

Related U.S. Application Data

[63] Continuation of Ser. No. 476,871, Mar. 10, 1983, abandoned.

[30] Foreign Application Priority Data

| Jul. 14, 1981 | [JP] | Japan | 56-109673 |
| Dec. 5, 1981 | [JP] | Japan | 56-196206 |
| Dec. 24, 1981 | [JP] | Japan | 56-212241 |
| Dec. 24, 1981 | [JP] | Japan | 56-212242 |
| Feb. 26, 1982 | [JP] | Japan | 57-30149 |
| May 10, 1982 | [JP] | Japan | 57-76673 |

[51] Int. Cl.$^4$ .............. C04B 41/81; H01F 1/08
[52] U.S. Cl. .............. 264/62; 264/60; 310/154; 335/296; 335/302; 335/304; 335/306
[58] Field of Search .............. 148/31.57, 101, 105, 148/122, 306; 264/DIG. 58, 60, 61, 62; 335/296, 302, 304, 306; 310/154, 152; 428/900

[56] References Cited

U.S. PATENT DOCUMENTS

| 3,723,587 | 3/1973 | Iwase et al. | 264/61 |
| 4,110,718 | 8/1978 | Odor et al. | 335/302 |
| 4,327,346 | 4/1982 | Tada et al. | 335/296 |
| 4,383,193 | 5/1983 | Tomite et al. | 335/302 |
| 4,397,796 | 8/1983 | Lotgering et al. | 264/24 |
| 4,438,362 | 3/1984 | Brown | 335/296 |
| 4,481,437 | 11/1984 | Parker | 310/154 |
| 4,491,756 | 1/1985 | Tomite | 310/154 |
| 4,508,988 | 4/1985 | Reiss et al. | 310/154 |
| 4,510,407 | 4/1985 | Tomite | 310/154 |

FOREIGN PATENT DOCUMENTS

1317524 5/1973 United Kingdom .

Primary Examiner—George F. Lesmes
Assistant Examiner—William M. Atkinson
Attorney, Agent, or Firm—Finnegan, Henderson, Farabow, Garrett & Dunner

[57] ABSTRACT

The present invention relates to a composite permanent magnet for magnetic excitation, used in a permanent type rotary machine such as permanent magnet type generators or permanent magnet type motors, which composite magnet comprises a first part and a second part both of which have the same basic composition, the first part having a higher residual magnetic flux density Br than the other, the second part having a higher coercive force $_IH_c$ than the first part, the first and second parts being integrated into one body. The composite permanent magnet has superior characteristics as composite permanent magnet for magnetic excitation.

6 Claims, 24 Drawing Figures

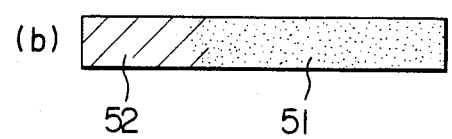
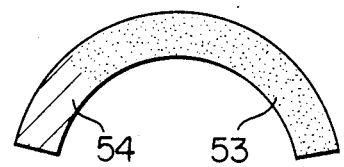
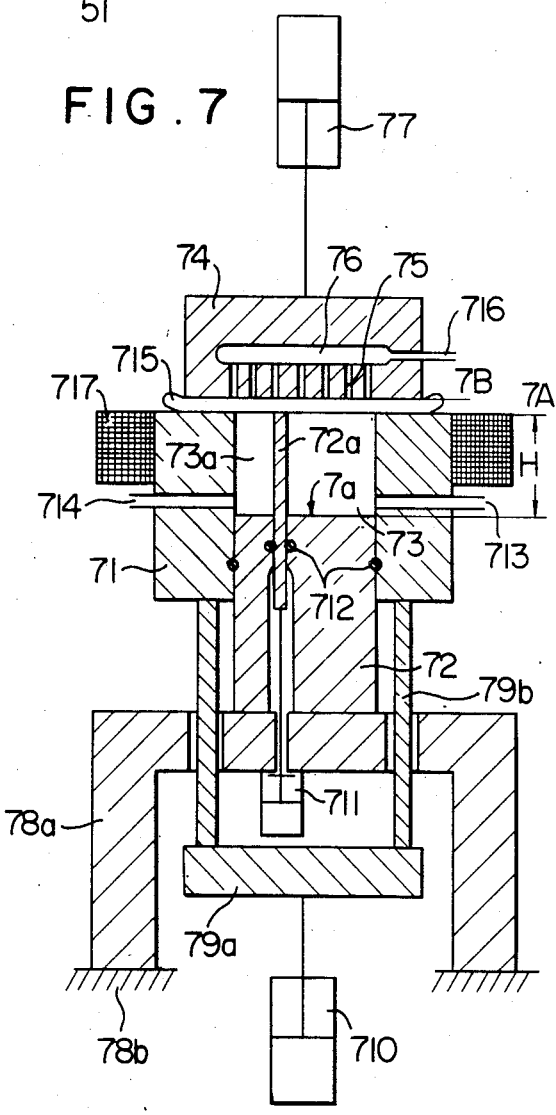

COMPOSITE PERMANENT MAGNET FOR MAGNETIC EXCITATION AND METHOD OF PRODUCING THE SAME

This application is a continuation of application Ser. No. 476,871, filed Mar. 10, 1983, now abandoned.

FIELD OF THE INVENTION

This invention relates to a composite permanent magnet for magnetic excitation which is used in a permanent magnet type rotary machine such as permanent magnet type generators or permanent magnet type motors. In particular, this invention relates to a composite permanent magnet for magnetic excitation which provides a high output and is highly resistant to demagnetization caused during the operation of a rotary machine.

BACKGROUND OF INVENTION

Permanent magnet type rotary electric machines, particularly small sized motors, generators and the like employing an arc-segment-shaped ferrite magnet have hitherto been widely used. Recently, the application of ferrite magnets has been extended to larger type motors. Particularly, such motors as a starter motor for driving an engine and a motor for driving a compressor in an air conditioner are, in many recent cases, subjected to heavy loads at the time of starting. In view of the strong demagnetizing field developed by the armature reaction in these motors, ferrite magnets having high resistance to demagnetization have been used. However, conventional ferrite magnets (particularly those used for starter motors) have in some cases been considerably demagnetized by an over current or by the starting current at low-temperature starting and, accordingly, are not satisfactory in terms of of reliability.

An example of a conventional permanent magnet type rotary machine has a cross sectional view as shown in FIG. 1. In the figure, a rotor 1 comprising an armature core (on which is provided an armature winding) and a commutator is supported by end brackets through bearings. A housing 2 supports permanent field magnets 31, 32. With this version of permanent magnet type rotary machine, there is an increasing demand for a more compact design, higher performance and higher output. For attaining a higher output, the permanent magnet used as the field magnet must have a higher residual flux density Br. On the other hand, enhancing the output is accompanied by an increase in the demagnetizing field developed by the armature reaction, giving rise to the need to use as the field magnet a permanent magnet having a higher coercive force $_jH_C$. Therefore, the use of a samarium-cobalt sintered permanent magnet having a coercive force $_jH_C$ of about 15 kOe and a residual flux density of about 12 kG may be contempleted. This magnet, however, has the problem of high cost and poor mechanical strength (usually, a bending resistance on the order of 13 kg/mm$^2$). It is also contemplated to use a ferrite produced from an inexpensive material, for example, a permanent magnet of sintered hexagonal lattice type oxide which has a basic composition consisting mainly of $MO.nFe_2O_3$ (where M is selected from Ba, Si, Pb and Ca, or a mixture thereof; n is a number of 5 to 6), but with such material it is difficult to obtain an integrally formed permanent magnet having both a high residual flux density (Br) and a high coercive force ($_jH_c$) in combination. Thus, in cases of rotary machines with a conventional single-composition type permanent magnet used as field magnet, there have been certain limits on the improvement of performance, such as output, torque and resistance to demagnetization.

To overcome the limitations envolved in the conventional techniques, an improved permanent magnet field system for rotary machines has been proposed (Japanese Laid-Open Patent Publication No. 52-61712 entitled "Permanent Magnet Type Rotary Machine").

The present invention, based on further improvements to overcome the problems mentioned above, provides a composite type permanent magnet capable of exhibiting excellent properties for use as magnet for magnetic excitation and a method for producing the composite permanent magnet.

DISCLOSURE OF INVENTION

FIG. 2 shows a cross-sectional view of an improved rotary machine fabricated by utilizing this invention. In FIG. 2, a housing 2 supports permanent field magnets each of which is composed of a plurality of permanent magnets 311 and 312 (or 321 and 322) having magnetic properties different from each other, the feature being distinguished from the rotary machine shown in FIG. 1. In a embodiment in the abovementioned Laid-Open Patent Publication No. 52-61712, a rotary machine is described in which a permanent magnet having the magnetic characteristics of Br=4200 G and $_jH_c$=2500 Oe and a permanent magnet having the characteristics of Br=3400 G and $_jH_c$=4000 Oe are secured to a housing in a parallel manner so that the two magnets together serve as a permanent field magnet. However, when securing two permanent magnets to a housing in a parallel manner as in the abovementioned example, the assembly is more complicated than in the case of using a single-composition type permanent field magnet as shown in FIG. 1, and there arises the problem that the dimensional accuracy of a magnetic gap cannot easily be obtained.

This invention provides a permanent magnet for use as field magnet, composed of a plurality of integrated magnetic materials, one of which has a higher residual flux density Br relative to others (hereinafter referred to as a high-Br material) and another has a higher coercive force $_jH_c$ relative to the former. The permanent magnet for use as field magnet is produced, for example, by charging two types of materials having essentially the same basic composition into a mold provided with a partition for separating the materials from each other, then removing the partition and producing an integral molded body of composite permanent magnet for magnetic excitation followed by sintering the body at a high temperature.

Conventionally, a high-Br material and a high-$_jH_c$ material have respective appropriate sintering temperatures that differ considerably from each other. For example, in a case of oxide permanent magnets, the sintering temperature for one high-Br material is 1280° C. whereas the sintering temperature for another high-$_jH_c$ material is 1100° C. Accordingly, it has never been contempleted to integrally mold a high Br material and a high-$_jH_c$ material into one body and sinter the materials at the same temperature.

The inventors have found that, when a useful additive is admixed with a high-$_jH_c$ material, the high-$_jH_c$ material portion can retain a high coercive force $_jH_c$ and exhibit a sufficient mechanical strength after sintering even if the sintering temperature is selected in favor of a high-Br material. The composite permanent magnet of this invention has been obtained on the basis of this finding.

BRIEF DESCRIPTION OF THE DRAWINGS

FIGS. 5(a) and (b) respectively shows the front views of a test piece of a conventional magnet and a test piece of a magnet of this invention;

FIG. 6 is a front view of a permanent magnet for use in a rotary machine, according to one embodiment of this invention;

FIG. 7 is a fragmentary vertical cross section of a molding device according to this invention;

Figs. 11a and 11b are cross sectional views of a molded body obtained in an example, while FIG. 11(b) shows a front view of the molded body;

DESCRIPTION OF THE PREFERRED EMBODIMENTS

This invention will now be described further in detail, referring to the following embodiments.

Embodiment 1:

A strontium ferrite material containing an amount of Si added thereto (a high-Br material) and a strontium ferrite material containing 3.2 weight % of $Al_2O_3$ added thereto (a high-$_jH_c$ material) were charged into a die with a partition being set between the materials. After removing the partition, the charged material was pressure compacted and sintered at 1280° C. which is a suitable sintering temperature for the high-Br material, to obtain a composite permanent magnet for field system in the form of an integral sintered body 4 (with a transverse cross sectional view shown in FIG. 3) composed of the high-Br material 412 having the magnetic characteristics of Br=4180 G, $_jH_c$=3200 Oe and the high-$_jH_c$ material 411 for which Br=3100 G and $_jH_c$=5100 Oe. When the thus obtained integral sintered body 4 was used as a permanent magnet for field system in assemblying a rotary machine, the assembly was facilitated and the resulting rotary machine had an excellent dimensional accuracy as to the magnetic gap.

Figure 4:
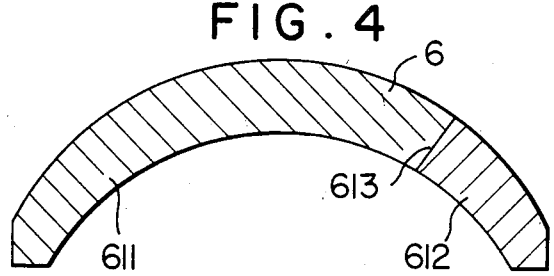
FIG. 4 is a cross-sectional view of another embodiment.

Embodiment 2:

A strontium ferrite material containing Si, Ca and B added in combination thereto (a high-Br material and a barium ferrite material containing 1.8 weight % of $Al_2O_3$ (a high-$_jH_c$ material) were both compacted integrally into one body. The compacted body was then sintered at 1200° C., a suitable sintering temperature for the high-Br material, to obtain an integrally sintered permanent field magnet 6 (the transverse cross sectional view is shown in FIG. 4, in which numeral 613 indicates a bond layer) which was composed of the high-Br material 612 having the magnetic characteristics of Br=4300 G, $_jH_c$=3100 Oe and the high-$_jH_c$ material 611 with Br=2900 G and $_jH_c$=5050 Oe.

In spite of the relatively high sintering temperature which was selected in favor of the high-Br material, the $Al_2O_3$ additive contained in the high-$_jH_c$ material produced a remarkable effect in providing the high coercive force $_jH_c$ of 5050 Oe.

As in the above description of the examples of this invention, when ferrite materials are used, satisfactory results can be obtained by using a suitable high-Br material which contains one kind or more of Ca, Si, B and the like and a suitable high-$_jH_c$ material of, for example, those containing $Al_2O_3$.

Figure 3:
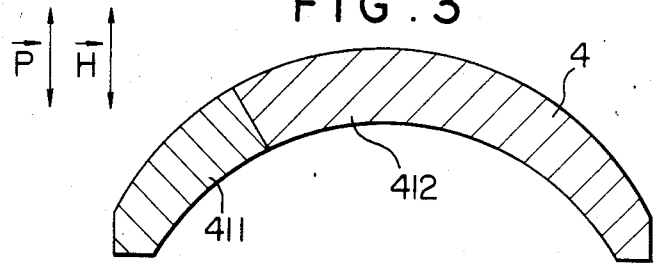
FIG. 3 is a cross-sectional view of one embodiment of this invention.

In producing the permanent field magnet according to this invention by wet compacting, the compressing direction $\vec{P}$ and the direction $\vec{H}$ of an applied field are preferably parallel to each other and in such direction as shown in FIG. 3 with respect to the compacted body.

The composite field magnet according to this invention can be also obtained by other method.

That is, a part of an arc-shaped pre-compacted homogeneous body or of a pre-fired body produced from the compacted body is applied or sprayed with a solution of an additive which will exert an effect on the crystal growth or the increase in density or other changes in magnetic particles at the time of firing. The body is then sintered to obtain an oxide permanent magnet in the form of an integral composite body having two or more types of magnetic characteristics. By utilizing the liquid-absorbing ability of the compacted or pre-fired body for the penetration of the solution into the body, the solution is applied or sprayed onto the surface of the desired part of the body. In this case, for clearly defining the desired part, the surface of the compacted body may be masked by a wax, grease or a surface-coating material when applying the solution, or alternatively, a shielding member may be used for part of the compacted or pre-fired body when spraying the solution.

The following are more detailed description of embodiments.

Embodiment 3:

A compacted body of Sr-ferrite magnet containing 0.9 weight % of $Al_2O_3$ obtained by wet-type compacting under a magnetic field was dried to a water content of 1.0% or lower, and a 25 wt. % aqueous solution of $Al(CH_3COO)_3$ was applied on a part of the dried body, which was then subjected to main firing at 1160° C. to obtain an integral composite body of an oxide permanent magnet. Table 1 shows the magnetic properties of the permanent magnet thus obtained. FIG. 5(a) is a front view of the compacted body specimen before the application of the solution, while FIG. 5(b) shows a front view of the compacted body after the application of the solution, with numeral 52 indicating the part applied with the solution.

TABLE 1

|  | Br (G) | $_BH_c$ (Oe) | $_IH_c$ (Oe) |
| --- | --- | --- | --- |
| Non-applied part | 3500 | 3240 | 4140 |
| Applied part | 3140 | 2920 | 4780 |

As is clear from Table 1, the part applied with the solution gave a magnet having a higher $_IH_c$ as compared to that of the non-applied part. A similar set of results were obtained in the case of firing the compacted body shown in FIG. 6.

Embodiment 4:

After the partial application of the 25 wt. % aqueous solution of Al(CH$_3$COO)$_3$ as in Example 3, a pre-firing treatment was carried out at 600° C. for 3 hours, and the part applied with the aqueous Al(CH$_3$COO)$_3$ solution was again applied with the same solution, while the remainder part which had not previously been applied with the solution was applied with a 10 wt. % aqueous CuSO$_4$ solution. The compacted body thus treated was then subjected to main firing, to yield an integral composite body of an oxide permanent magnet having the magnetic properties shown in Table 2.

TABLE 2

|  | Br (G) | $_BH_c$ (Oe) | $_IH_c$ (Oe) |
| --- | --- | --- | --- |
| The part applied with CuSO$_4$ solution | 3850 | 3600 | 4280 |
| The part applied with Al(CH$_3$COO)$_3$ | 3190 | 3000 | 5060 |

As seen from Table 2, the part applied with the aqueous Al(CH$_3$COO)$_3$ solution became a high-$_IH_c$ magnet.

Thus, the application or spraying of a solution on a part of a compacted body makes it possible to produce an integral composite body of an oxide magnet easily, without any considerable modification to the conventional manufacturing process.

Embodiment 5:

A compacted body of Al$_2$O$_3$-free Sr-ferrite magnet obtained by wet-type compacting in a magnetic field was dried to attain a water content of 1.0% below. Then, a part of the molded body was immersed a 12 wt. % aqueous Al(CH$_3$COO)$_3$ solution. After taking the body out of the solution, the body was fired at 1200° C. to give an integral composite body of permanent magnet, which exhibited differences in magnetic property between the impregnated part and nonimpregnated part. Table 3 showed the magnetic properties of the thus obtained magnet.

TABLE 3

|  | Br (G) | $_BH_c$ (Oe) | $_IH_c$ (Oe) |
| --- | --- | --- | --- |
| Non-impregnated part | 4120 | 3050 | 3090 |
| Impregnated part | 3620 | 3320 | 4040 |

An analysis of the impregnated part thus improved in the $_IH_c$ characteristic revealed the presence of aluminum in an amount of 0.16 weight %, which commensurate with an Al$_2$O$_3$ content of 0.3 weight %, implying that the enhancement in $_IH_c$ is obtained by the addition of Al$_2$O$_3$.

Embodiment 6:

The same compacted body as that used in Embodiment 5 was pre-fired at 900° C. for 30 minutes and, after the same impregnating treatment as in Embodiment 5, the body was subjected to main firing at 1200° C. to form an integral composite body of an oxide permanent magnet. Table 4 shows the magnetic properties of the magnet thus obtained.

TABLE 4

|  | Br (G) | $_BH_c$ (Oe) | $_IH_c$ (Oe) |
| --- | --- | --- | --- |
| Non-impregnated part | 4120 | 3050 | 3090 |
| Impregnated part | 3560 | 3260 | 4150 |

Embodiment 7:

A compacted body similar to that used in Embodiment 5 was pre-fired in the same conditions as in Example 6, and a part of the body was immersed in a 50 weight % aqueous CrO$_3$ for 1 minutes. After taking out the body from the solution, main firing of the body was conducted at 1200° C., whereby an integral composite body of oxide permanent magnet was obtained. Table 5 shows the magnetic properties of the magnet.

TABLE 5

|  | Br (G) | $_BH_c$ (Oe) | $_IH_c$ (Oe) |
| --- | --- | --- | --- |
| Non-impregnated part | 4090 | 3080 | 3130 |
| Impregnated part | 3300 | 3120 | 4730 |

It might be considered that CrO$_3$ is oxidized to Cr$_2$O$_3$ during the main firing.

Embodiment 8:

A part of a compacted body of Sr-ferrite magnet containing 0.3 weight % of SiO$_2$ and 0.2 weight % of H$_3$BO$_3$, obtained by wet compacting in a magnetic field, was immersed in an aqueous solution containing Na(CH$_3$COO) and Al$_2$(SO$_4$)$_3$.mH$_2$O(m=17), followed by firing to obtain an oxide permanent magnet. The magnetic properties of the magnet are shown in Table 6.

TABLE 6

|  | Br (G) | $_BH_c$ (Oe) | $_IH_c$ (Oe) |
| --- | --- | --- | --- |
| Non-impregnated part | 4100 | 3700 | 4120 |
| Impregnated part | 3860 | 3480 | 5090 |

Thus, a permanent magnet having high magnetic properties was obtained by the combined effects of Na(CH$_3$COO) and Al$_2$(SO$_4$)$_3$.mH$_2$O.

In the method of producing a magnet according to the invention, a solution containing Na, Si, B, Ti, Al, Cr, Ca, Sr, Pb, Ba or the like in the form of ions, or an aqueous solution of boric acid, borax, water glass or the like, or an aqueous solution containing NO$_3$, CrO$_4$, COOH, PO$_3$, SO$_4$ or BO$_3$ in the form of ions may be used as a source of a substance for changing the magnetic properties. Also, use of aluminum sulfate, sodium acetate, aluminum chloride or ammoniumalum yields favorable results.

Next, the following is a description of embodiments of compacting slurries, wherein a mold cavity is divided into a plurality of cavity portions by using partition members, then slurries containing ferrite materials of different properties are charged into the cavity portions, respectively, and the partition members are removed to compact the slurries.

Figure 8:
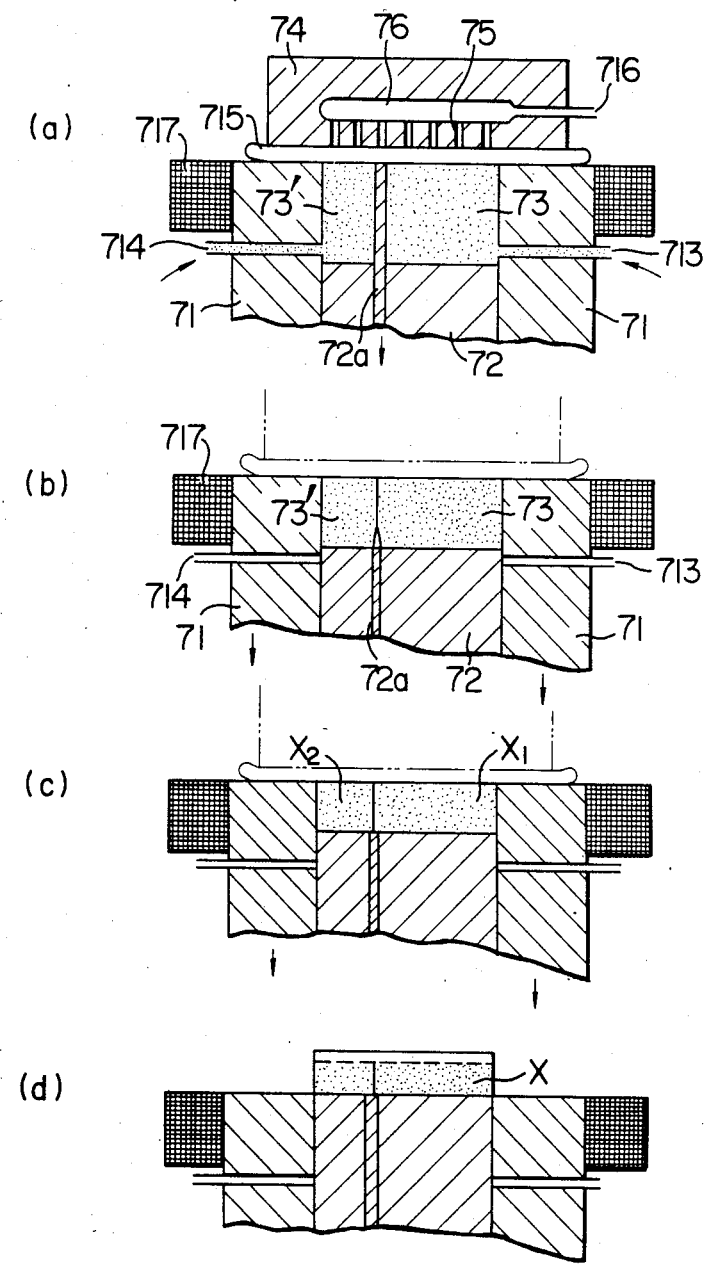
FIGS. 8a to 8d show fragmentary vertical cross sections of a mold, indicating the states of molding in an embodiment of this invention.
Figure 9:
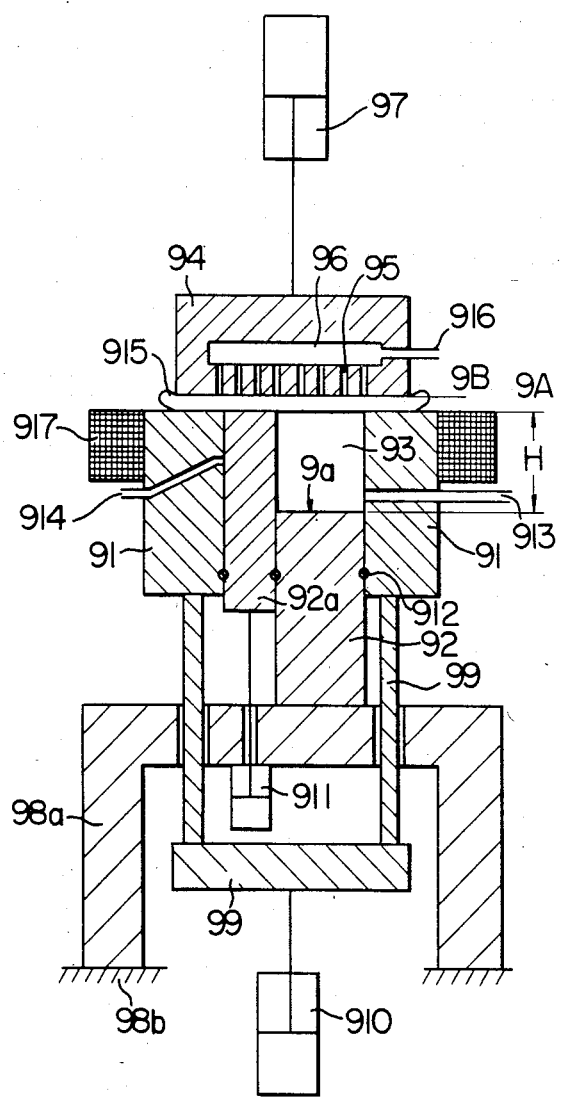
FIG. 9 shows a fragmentary vertical cross section of a molding machine according to this invention.

Embodiment 9:

FIG. 7 shows a fragmentary vertical section of a compacting apparatus used in this invention, and FIG. 8 shows fragmentary vertical sections of a mold for carrying out the process of producing a compacted magnet body by using the compacting apparatus shown in FIG. 7. In the figures, a main body 71 of mold is supported by a plurality of shaft 79b fixed to a movable plate 79 attached to a lower cylinder 710, so that the main body 71 can be moved up and down. The main body 71 is provided with a mold cavity 73, and side walls of the cavity are provided with inlet holes 713, 714 for slurries, respectively. Each of the holes 713, 714 is connected to a slurry conveying device (not shown). A lower punch 72 is supported on a stand 78a placed on a floor 78b, and a partition member 72a is fitted in a part of the punch 72 in such a manner that the partition member 72a can be moved in vertical direction by an intermediate cylinder 711 to form a plurality of mold cavity portions 73, 73a. In order to prevent the leakage of the slurry due to the slurry pressure inside the cavity 73, packings 712 such as an O-ring are fitted at a peripheral part of the lower punch 72 and at joint parts between the punch 72 and the partition member 72a. An upper punch 74 fixed to an upper cylinder 77 is movable in the vertical direction and can be mated with the upper surface of the cavity part 73. The upper punch 74 is provided with drain holes 75 through which a liquid medium of the slurry is drained from the interior of the cavity part 73 while being filtered through the filter member 715, and the medium is discharged to the exterior of the apparatus through a liquid collecting chamber 76 and a liquid discharging passage 716. At the periphery of the main body 71 is placed a field coil 717 which permits a magnetic powder to be oriented during the compacting process.

The compacting apparatus is operated as follows.

The upper surface of the lower punch 72 fixed to the stand 78a constitutes a reference plane 7a, on the basis of which the partition member 72a, the cavity side walls of the main body 71 and the upper punch 74 mounted through the filter member 715 are moved in the vertical direction in sequence. First, the lower cylinder 710 is operated to move the main body 71 up to a level 7A through the shafts 79b provided on the movable plate 79a. The upper punch 74 is lowered onto the top face 7B of the main body 71, with the filter member 715 held therebetween. At the same time, the partition member 72a is moved upwardly through the operation of the intermediate cylinder 711 until the top face of the partition member reaches the plane 7A so as to define the other cavity part 73a so that the cavity part 73 is defined by the upper punch 74, the cavity side walls of the main body 71 and of the partition member 72a, the lower punch 72 and the like. Next, referring to FIG. 8(a), slurries are fed at high pressures from slurry conveying devices (now shown) into the cavity parts 73, 73' through inlet holes 713' and 714, respectively, of the main body 71. While introducing the slurry into the cavity in a magnetic field, the feed pressure causes the liquid medium of the slurry to be drained sequentially through the filter member 715 and drain holes 75 into the liquid collecting chamber 76, from which the medium is discharged to the exterior through the discharge passage 716, that is to say, a preforming process is under way. While the upper punch 74 is being pressed slowly downward by the upper cylinder 77 and the surface 7B of the main body 71 is being punched downward, the feed of the slurry under pressure is continued until the inlet hole 713 is closed by the lower punch 72. The feed is set to be stopped when the inlet holes 713, 714 are closed. After preforming to the level of the lower punch surface 7b in FIG. 8(b), the partition member 72A is lowered by the intermediate cylinder 711 until the top face of the member 72A becomes flush with the surface 7A of the lower punch 72, providing a unified cavity thereover. Then, the upper punch 74 and the main body 71 are further lowered at a slightly higher speed and, simultaneously, the floating pressures of the upper cylinder 710 and the intermediate cylinder 711 are gradually released, while pressing the material between the upper punch 74 and the lower and the moving punches 72, 72a to accomplish a final pressing in FIG. 8(c). At this moment, the floating pressures of the lower cylinder 710 and the intermediate cylinder 611 have been released to a pressure just sufficient to support the weights of the main body 71 and the like.

At this point, the compacted body $X_1$ charged in the cavity part 73 on the right and the compacted body $X_2$ of a different material charged in the cavity part 73' on the left are being obtained as an integral compact, which will be subjected to the final pressing by the upper cylinder 77 to become a perfectly integral compacted article. All the pressing for compacting is completed when the pressure of the upper cylinder 77 is released. Further, the main body 71 of the mold is lowered to the position shown in FIG. 8(d) to take the compacted body X out of the mold, completing one cycle.

Although the above example is described with a flat plate-like compact, a special shape compact (e.g., arc shapes) can be carried out as above by changing the lower punch, the upper punch and the like. In compacting to obtain a compacted body as above, a strontium ferrite material containing Si added thereto (a high-Br material) was used for one part of the molded body 720 and a strontium ferrite material containing $Al_2O_3$ added thereto (a high-$_I$Hc material) was used for other part of the body 720, and the operations of the above example were carried out, to obtain an integrally compacted composite body. The composite body was fired to obtain an integral composite permanent magnet for use as field magnet.

Figure 1:
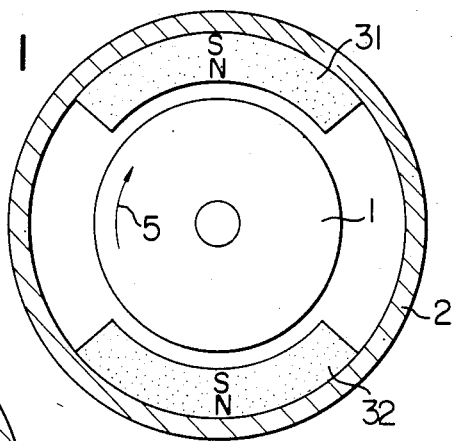
FIG. 1 is a cross-sectional view of a conventional rotary machine.
Figure 2:
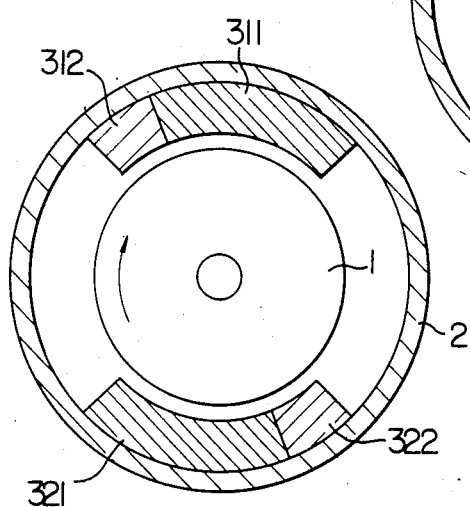
FIG. 2 is a cross-sectional view of an improved rotary machine embodying the present invention.
Figure 10:
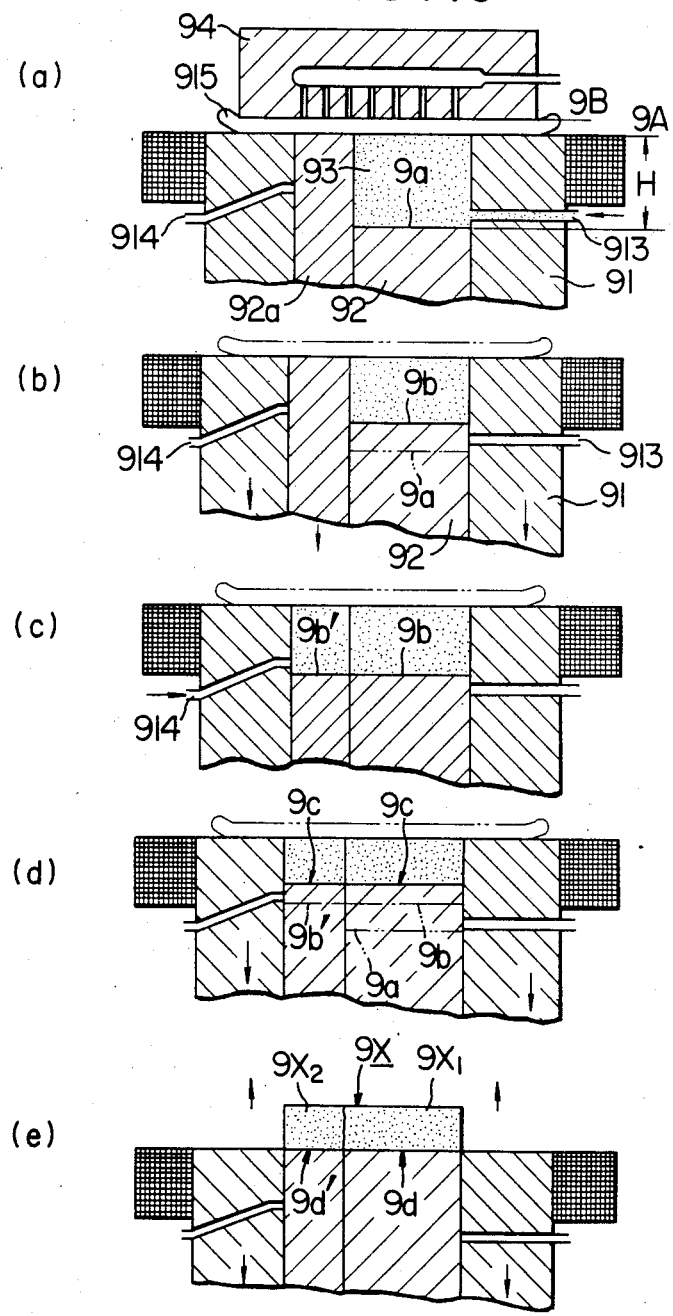
FIGS. 10a to 10e shows fragmentary vertical cross sections of a mold, indicating the states of molding in an embodiment of this invention.
Figure 11:
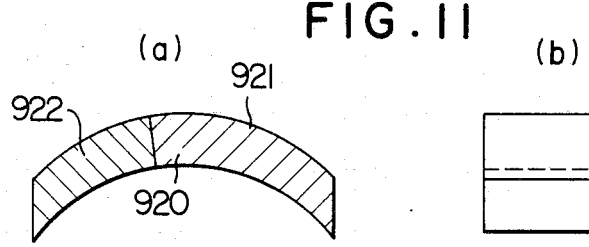

Embodiment 10:

FIG. 1 shows a fragmentary vertical section of a compacting apparatus used in this invention, and FIG. 11 shows fragmentary vertical sections of a mold for carrying out the process of producing a compacted magnet body by using the compacting apparatus shown in FIG. 10. In both the figures, a main body 91 of mold is supported by a plurality of shafts 99b fixed to a movable plate 99 attached to a lower cylinder 910, so that the main body 91 can be moved up and down. The main body 91 is provided with a mold cavity 93, and side walls of the cavity are provided with inlet holes 913, 914 for slurries, respectively. Each of the holes 913, 914 is connected to a slurry conveying device (not shown). A lower punch 92 is supported on a stand 98a placed on a floor 98b, and a movable punch 92a is mounted on the stand 98a in such a manner that it can be moved up and down by an intermediate cylinder 911 to provide the mold cavity. In order to prevent the leakage of the slurry due to the slurry pressure inside the cavity 93, packings 912 such as an O-ring are fitted at the peripheral parts of the lower punch 92 and the movable punch 92a. An upper punch 94 fixed to an upper cylinder 97 is movable in the vertical direction and can be mated with the upper surface of the cavity part 93. The upper punch 94 is provided with drain holes 95 through which a liquid medium of the slurry is drained from the interior of the cavity part 93 while being filtered through the filter member 915, and the medium is discharged to the exterior of the apparatus through a liquid collecting chamber 96 and a liquid discharging passage 916. At the periphery of the main body 91 is placed a field coil 917 which permits a magnetic powder to be oriented during the molding process.

The molding apparatus is operated as follows.

The upper surface of the lower punch 92 fixed to the stand 98a constitutes a reference plane 9a, on the basis of which the movable punch 92a, the cavity side walls of the main body 91 and the upper punch 94 mounted through the filter member 915 are moved in the vertical direction in sequence. First, the lower cylinder 910 is operated to move the main body 91 up to a level 9A through the shaft 99 provided on the movable plate 98. The upper punch 94 is lowered onto the top face 9B of the main body 91, with the filter member 915 held therebetween. The cavity part 93 is defined by the upper punch 94, the cavity side walls of the main body 91 and of the movable punch 92a, the lower punch 92 and the like by moving the movable punch 92a upwards through the operation of the intermediate cylinder 911 until the top face of the movable punch 92a reaches the reference plane 9A so as to simultaneously define an uncharged part. Next, referring to FIG. 10(a), a slurry is fed at high pressure from slurry conveying devices (not shown) into the cavity part 93 through the inlet hole 913. While introducing the slurry into the cavity, the feed pressure causes the liquid medium of the slurry to be drained sequentially through the filter member 96, and the drain holes 95 into the liquid collecting chamber 96, from which the medium is discharged to the exterior through the discharge passage 916, that is, a preforming process is under way. While the upper punch 94 is being pressed slowly downward by the upper cylinder 97 and the surface 9B of the main body 91 is also being punched downward, the feed of the slurry under pressure is continued until the inlet hole 913 is closed by the lower punch 92. The feed is set to be stopped when the inlet hole 913 is closed. After preforming to the level of the lower punch surface 9b in FIG. 10(b), the movable punch 92A is lowered by the intermediate cylinder 911 so as to be flush with, or slightly below, the surface 9A of the lower punch 92, thereby providing a new mold cavity part 93' above the movable punch. A slurry of other material is charged into the mold cavity 93' by a slurry feeder (not shown) through the inlet hole 914 of the main body 91. While the slurry is introduced, FIG. 10(c), a preforming operation and the discharge of a drained liquid are carried out in the same manner as described above. Then, the upper punch 94 and the main body 91 are further lowered at a slightly higher speed and, simultaneously, the floating pressures of the upper cylinder 910 and the intermediate cylinder 911 are gradually released, while pressing the material between the upper punch 74 and the lower and the movable punches 92, 92a to accomplish a final pressing in FIG. 10(d). At this moment, the floating pressures of the lower cylinder 910 and the intermediate cylinder 911 have been released to a pressure sufficient to support the weights of the main body 91 and the like.

At this point, the compacted body 9X₁ charged firstly into cavity part 93 and the compacted body 9X₂ of other material charged subsequently into the cavity part 93' are being obtained as an integral compact, which will be subjected to the final pressing by the upper cylinder 97 to become a perfectly integral compacted article. All the pressing for compacting is completed when the pressure of the upper cylinder 97 is released. Further, the main body 91 of the mold is lowered to the position shown in FIG. 10(e) to take out the compacted body 9X from the mold, completing one cycle.

Although the above example is described with a flat plate-like compact, a special shape compact (e.g., arc shapes) can be carried out as above by changing the lower punch, the upper punch and the like. In compacting to obtain a compacted body as above, a strontium ferrite material containing Si added thereto (a high-Br material 921) was used for one part of the compacted body 920 and a strontium ferrite material containing $Al_2O_3$ added thereto (a high-$_IH_c$ material 922) was used for other part of the body 920, and the operation of the above example was carried out, to obtain an integrally compacted composite body. The composite body was fired to obtain an integral composite permanent magnet. With the permanent magnet used as field magnet in assembling a rotary machine, the resulting magnet-type rotary machine showed a greatly enhanced performance owing to the improvement of output. Further, this invention improves the demagnetizing factor to 1% or below, which is contrasted to the demagnetizing factor of 20–30% obtained with a rotary machine incorporating a conventional magnet of a single material. This invention also has many other effects such as a remarkable effect in simplifying the working process for production of a magnet and assembly of a rotary machine, and enhancing the efficiency.

Figure 14:
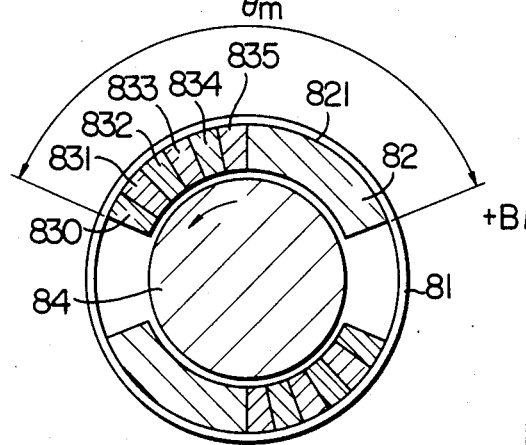
FIG. 14 is a cross-sectional view of a permanent magnet type DC motor according to an embodiment of this invention.

Embodiment 11:

FIG. 14 shows a cross sectional view of a permanent magnet type DC motor, in which arc segment shaped ferrite magnets 821 are fixed on the inside of a stator yoke 81, each magnet 821 being in the range of an angle $\theta m$. In the magnet 821, about one half on the backward side (run-in side) as to the rotating direction (the direction of arrow) of the armature 84 comprises a ferrite magnet 82 having a high Br, while the rest on the forward side (run-out side) as to the rotating direction is composed of ferrite magnets 830–835 of which the $_IH_c$ value is decreased, and the Br value increased, substantially continuously from the end face toward the center. Namely, the ferrite magnet 821 has the ferrite magnet 835 of high Br and low $_IH_c$ on the center side and the ferrite magnet 830 of high $_IH_c$ and low Br on the end side.

Figure 12:
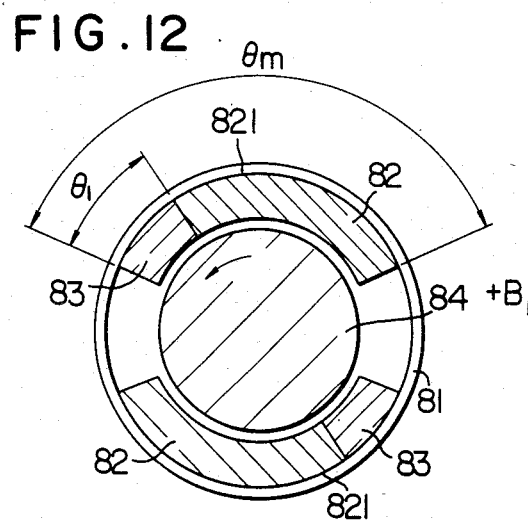
FIG. 12 shows a cross-sectional view of a motor according to a conventional art.
Figure 13:
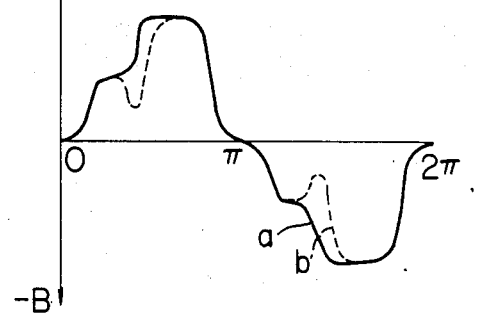
FIG. 13 is a magnetic flux density distribution diagram for the air gap in a conventional field system.
Figure 15:
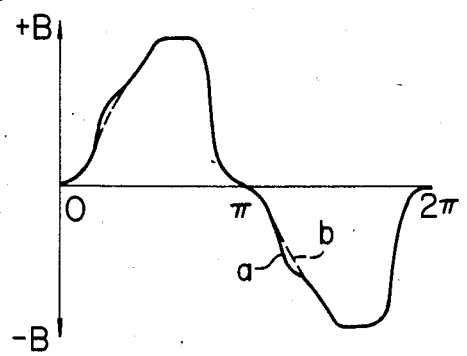
FIG. 15 is a flux density distribution diagram for the gap in a field system according to the embodiment of this invention shown in FIG. 14.

FIG. 15 shows a flux density distribution diagram for a gap between the armature and the permanent magnet, in which curve the latter indicate the state after saturation magnetization and curve b indicates the state after demagnetization by a demagnetizing field under the armature reaction arising from an overcurrent. As seen from FIG. 15, the permanent magnet of this invention is highly stable to external demagnetizing fields, shows little demagnetization and can be used for a DC motor with high reliability. In general, a higher $_IH_c$ is effective in increasing the demagnetization resistance of a ferrite magnet, but the accompanying reduction in Br leads to a lower flux density at the gap, a smaller effective flux and a lower torque performance of the motor. In this invention, however, the end magnet 830 consisting of the high $_IH_c$ material occupies only a very small percentage of the volume of the whole magnet and, therefore, a highly reliable motor can be obtained with minimum reduction in the motor performance. FIGS. 12 and 13 show a cross sectional view and a flux density distribution diagram (corresponding to FIG. 14 and 15) for a comparative exahple.

The magnetic properties of the permanent magnet of this invention can be continuously varied, for example, by providing magnets containing continuously varied amounts of aluminum oxide or other metal oxide and by combining the magnets so as to constitute a magnet of different characteristic values.

This invention provides a motor excellent integral composite oxide permanent magnet with magnetic characteristics varying from part to part by specifying the difference in sintered density between a sintered part of high $_jH_c$ and a sintered part of high Br.

The oxide permanent magnet according to this invention is a composite, integral sintered magnet comprising at least two parts which have different magnetic properties. When the difference in sintered density between a sintered part having a higher coercive force and a part having a higher residual flux density is set to be not more than 0.5 g/cc, the magnetic properties can be balanced between the high-Br side and the high-$_jH_c$ side. The difference in sintered density is preferably about 0.3 g/cc.

Embodiment 12:

In a pre-fired powder having a SrO/Fe$_2$O$_3$ molar ratio of from 5.2 to 5.8, there were added 0.8 to 1.2 weight % of CaCO$_3$ and 0.3 to 0.6 weight % of SiO$_2$ as additives for higher Br, and the resulting mixture is ground to an average particle size of 0.6 to 1.1 μm to obtain a high-Br ground powder. On the other hand, in the same pre-fired powder there were added 0.8 to 1.6 weight % of CaCO$_3$, 0.4 to 1.0 weight % of SiO$_2$ and 1.5 to 4.0 weight % of Al$_2$O$_3$ as additives for higher $_jH_c$, and the resultant mixture was ground to an average particle size of 0.6 to 1.1 μm to obtain a high-$_jh_c$ ground powder. The amounts of the additives used are naturally dependent on the particle size of the ground powders, the range of the desired magnetic properties, sintering temperatures, etc. The abovementioned ranges, therefore, are only an example and this invention can be carried out using the additives in amounts beyond the abovementioned limits. The two kinds of ground powders were respectively turned into slurries each containing 0 to 1 weight % of PVA and 50 to 70 weight % of the magnetic powder. The slurries are separately charged into divided cavities of a 100×50 mm mold provided with a 1-mm thick partition at the central part. After removing the partition, wet compacting was conducted in a magnetic field of 5000 to 10000 Oe to obtain a compacted body measuring 100×50×10 mm, which was then sintered at a temperature of 1120 to 1200° C.

The magnetic properties of the thus obtained oxide magnet were measured, typical results of measurement being shown in Table 7.

TABLE 7

|  | Sintered density (g/cc) | Br (G) | $_jH_c$ (Oe) |
|---|---|---|---|
| High-Br side | 4.95 | 4150 | 2400 |
| High-$_jH_c$ side | 4.64 | 3200 | 5180 |

Similar results were also obtained when a Ba ferrite magnet was treated in the same manner as above.

Embodiment 13:

A slurry containing the same high-Br ground powder as in Example 12 was compacted in an applied magnetic field of 8000 to 100,000 Oe to obtain a compacted body of a single component, having the same size as that in Example 12. After drying the compacted body at a temperature of 90 to 100° C. until the water content is reduced to 4 weight % or below, a predetermined part of the body was immersed in a 20 to 25 weight % aqueous solution of aluminum acetate at room temperature to impregnate the part with the solution. The effect of this immersion may also be obtained by applying or spraying an aqueous solution containing Al$^{3+}$ ions. The compacted body thus treated was dried and then sintered at a temperature in the range of 1100 to 1200° C. The results are shown in Table 8.

TABLE 8

|  | Sintered density (g/cc) | Br (G) | $_jH_c$ (Oe) |
|---|---|---|---|
| 1 High-Br side | 4.68 | ↓ 3820 | ↑ 4130 |
| 2 | 4.66 | ↓ 3780 | ↑ 4150 |
| 3 | 4.65 | ↓ 3660 | ↑ 4240 |
| 4 | 4.53 | ↓ 3500 | ↑ 4520 |
| 5 | 4.35 | ↓ 3340 | ↑ 4770 |
| 6 High-$_jH_c$ side | 4.18 | ↓ 3220 | ↑ 5170 |

In FIG. 8, the parts exhibiting high $_jH_c$ values are those which had been impregnated or doped with Al$^{3+}$. It is clear from Table 8 that the results obtained in the immersion method show essentially the same tendency as those obtained by the press compacting method described in Example 12. For achieving a high $_jH_c$ value, it was necessary to control the difference in sintered density between the high-$_jH_c$ side and the high-Br side to within specified limits.

The thus obtained magnet having a high coercive force at a part thereof is extremely useful for various rotating machines which are required to have high resistance to demagnetization.

In the abovementioned examples, plate-like magnet shape was adopted for the purpose of accurately measuring the residual flux density Br, coercive force $_jHc$ and sintered density of the product. For magnets in the shape of arc segment which is usually the case with integral composite magnets used in rotary machines, essentially the same results as those for the plate shaped magnets have also been obtained.

The sintered magnet of this invention having a controlled sintered density also has other excellent effects such as reduction in size and weight, energy savings, etc. and has a great value on an industrial basis.

The composite permanent magnet for magnetic excitation according to this invention is highly suitable for use in startor motors, servo motors, magnet type generators and other placed where a demagnetizing field exerts, and is of great industrial value.

What is claimed is:

1. A method of producing a composite permanent magnet for magnetic excitation comprising a first material and a second material both of which have the same basic composition integrally formed into one body, said first material having a higher residual magnetic flux density Br as compared to the second material, and said second material having a higher coercive force $_jHc$ as compared to the first material wherein oxide powder mainly containing Mo.nFe$_2$O$_3$ (where M is an element selected from the group consisting of Ba, Sr, Pb and Ca or a mixture thereof, and n is a number of 5 to 6) is compacted, then a part of the resultant compacted body is impregnated with a liquid containing one kind or more cations or electropositive atoms of metallic or semimetallic elements, or one or more molecular cations or electropositive molecules containing one or more metallic or semimetallic elements, or a mixture thereof, and the body being fired so that the coercive force $_iHC$ of the part impregnated with said liquid become higher than that of the non-impregnated part because of a substance contained in said liquid.

2. A method according to claim 1, wherein said liquid contains, in addition to said cations or electropositive substances, a material selected from the group consisting of $NO_3$, $CrO_4$, $COOH$, $PO_3$, $SO_4$ and $BO_3$.

3. A method according to claim 1, wherein the cation or electropositive substance is Na, Si, B, Ti, Al, Cr, Ca, Sr, Ba, Pb or a molecule containing such elements.

4. A method according to claim 1, wherein said liquid contains a member selected from the group consisting of aluminum sulfate, sodium acetate, aluminum chloride, ammonium alum, sodium sulfate, potassium sulfate, potassium phosphate, and mixtures thereof.

5. A method according to claim 1, wherein said liquid contains boric acid, borax or water glass.

6. A method according to claim 1, wherein the difference in sintered density between the part having a high coercive force and the part having a high residual flux density is not more than 0.5 g/cc.

* * * * *